March 3, 1964 C. HENS 3,123,459
PROCESS AND APPARATUS FOR BENDING GLASS
Filed June 11, 1954
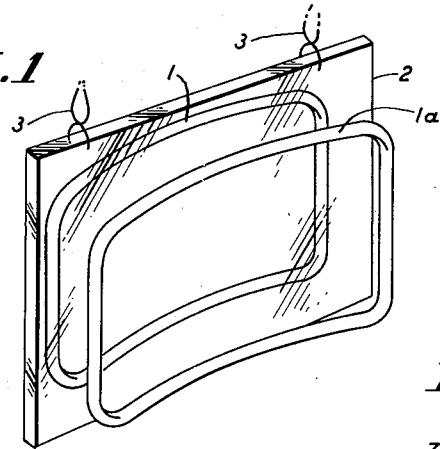
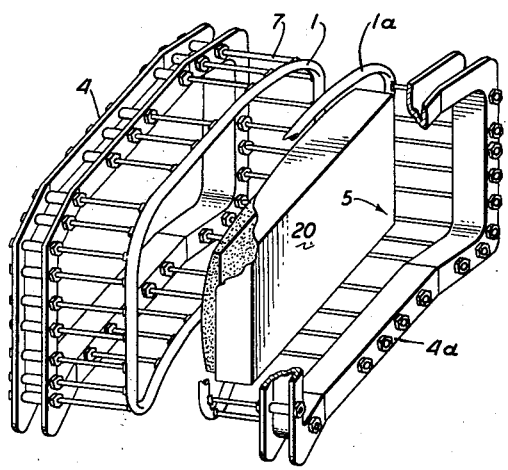
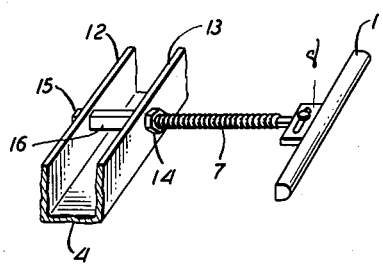
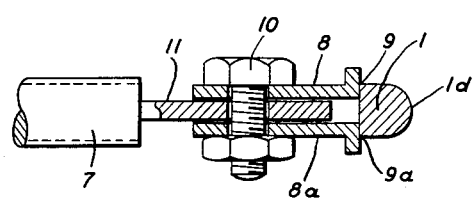
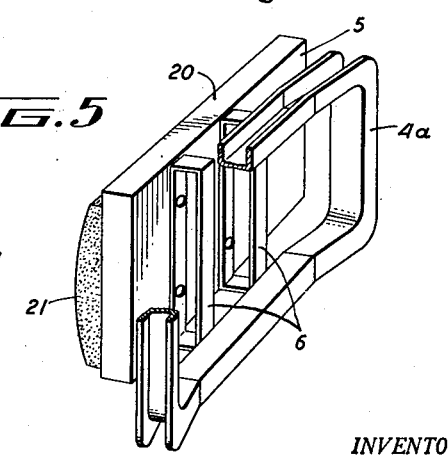
INVENTOR.
CARL HENS.
BY
Attorneys.

United States Patent Office 3,123,459
Patented Mar. 3, 1964

3,123,459
PROCESS AND APPARATUS FOR BENDING GLASS
Carl Hens, Herzogenrath, Germany, assignor to
Compagnie de Saint-Gobain, Paris, France
Filed June 11, 1954, Ser. No. 436,176
Claims priority, application France June 17, 1953
6 Claims. (Cl. 65—106)

This invention relates to glass bending. It particularly relates to the bending of glass sheets and plates and it is ideally adapted for the manufacture of automobile windshields. It involves a novel process, and novel apparatus, both of which will be described in particular relation to the manufacture of windshields, it being understood that the particular description does not consitute a limitation.

It is known, to bend a glass sheet or plate, to suspend it by one of its edges by means of grippers, to raise its temperature to the range which is customarily employed for bending, which is usually the deformation point of a particular glass being bent, and then to admit the sheet to a press having two jaws which fully engage its opposite sides and which have the shape desired in the final object. The jaws being pressed together upon the hot sheet the latter takes the form of the jaws and when cooled retains the curvature imparted by them. In that process it is frequently the case that the faces of the glass sheets received impressions, or are so affected by the pressure, that the surfaces of the object suffer damage which adversely affects the transparency of the object. These impressions, or this result is caused by the contact of the press jaws with the hot glass when it is in a plastic state.

It is an object of this invention to bend glass, particularly glass sheets and plates, without pressing it between jaws which subject its surfaces to pressure.

I have discovered that glass which is at bendable temperature can be bent to proper and satisfactory shape, without applying damaging pressure to the faces of the sheet, by applying bending pressure only to the outline of the desired object, leaving the areas within that outline unpressed and unmarred. I have also discovered a method and apparatus by which the new bending technique can be assisted without marring the surface of the glass.

I have, furthermore, developed apparatus capable of carrying out the invention in a satisfactory way. The invention, in other words, involves the application of bending stresses to the hot glass in a location confined to an annular region approximating the outline of the desired object; this process may be carried out by using bending frames which are no more than the outlines or borders of the jaws of the bending presses formerly employed.

The invention may be used to produce a cylindrical bending, that is a bending of the glass sheet around a single axis and it may also be used to produce a double or compound bending, which involves a bending of the glass around more than one axis so as to produce a double curvature. The curvature which can be imparted to the glass by this invention without marring is greater than that which could be imparted by full presses.

In accordance with a modification of the invention, one may assist the action of the bending frames by means of a buffer which is applied, more or less simultaneously, with one of the frames, against one side of the glass within the frame. By this means one may quickly obtain the desired curvature without harmfully affecting the face of the hot sheet. The buffer is preferably flexible and resilient and may advantageously comprise a flexible cushion of glass fibers, asbestos or the like. This auxiliary buffer is to be distinguished from the bending jaws of the prior art which engaged the faces of the glass and marred the surfaces engaged.

In the drawings, wherein like reference characters refer to like parts throughout the several views:

FIG. 1 is a diagrammatic perspective view of two bending frames in position to bend a sheet of glass to the shape of a windshield.

FIG. 2 is an exploded view partly in section of a form of the invention having bending frames of which the curvature can be changed and having an auxiliary buffer.

FIG. 3 is a perspective view of the adjustable mounting of a bending frame on its support.

FIG. 4 is a detail of a pivotal connection in section, between the bending frame and its adjustable support.

FIG. 5 is a perspective view partly in section showing the mounting of a buffer on the support.

Referring now to FIG. 1, the annular pressing frames 1 and 1a are of conforming shape and curvature, the frame 1 being concave on the side toward the glass and the frame 1a being convex on its matching face. The sheet of glass 2 is held by grippers 3 and is at bending temperature. As the bending temperature for all types of glass is known in the industry, the details thereof are unnecessary to this specification. In carrying out the invention, the bending frames are moved toward each other, the center of arc of frame 1a engages the central portion of plate 2 first, and at the same time the sides of bending frame 1 engage the hot plate. As the two frames are moved toward each other, the glass is compelled to take a shape conforming to the curvature of the frames. All curvatures within the frames become identical with that of the frames as soon as the plate is in contact at all points of the annulus with the frames 1 and 1a.

The frames may be made of any metal which is inert and strong at the temperature of the glass.

The novel method carried out as indicated in FIG. 1 involves bringing the glass sheet to bending temperature, suspending it freely, applying bending stresses to an annular part of the glass sheet corresponding to the outline desired in the final product. After the curvature has been imparted, the sheet can be trimmed to the size of the bending frames. The glass sheet may also be cut to size in the first instance, to be bent after the cutting.

A material advantage is presented by this invention because the bending frames, while rigidly held during bending, may be composed of flexible bands which can be given different sets corresponding to different curvatures. This has a great advantage of permitting a single apparatus to be used to produce objects of different curvature, which was not possible with full contact bending apparatus.

A preferred form of the invention embodying this adjustable feature is shown in FIGS. 2 to 5 which also include the auxiliary buffer which is sometimes used in imparting double or compound curvature to glass.

Referring to these figures U-beam supports 4—4a of conforming shape serve to support the bending frames 1—1a. The supports 4—4a are movable toward and away from each other by appropriate mechanism not shown, and as they are thus moved they move the bending frames 1—1a toward and away from each other as the case may be. The buffer generally indicated by 5 may be present or not, as desired. If it is to be present, it may be supported on one of the U-beam supports, for instance 4a, by channel beams 6 as shown in FIG. 5. The attachment between the support and the beams may be by bolts, welding, or as desired.

The frames 1 and 1a are attached to rods 7 which have flat ends 11 engaged between L-beams 8—8a which are welded at 9—9a to bending frame 1. The flat ends 11 of the rod 7 are pivotally connected between the webs of L-beams 8—8a by means of a bolt 10. This pivotal connection facilitates the bending of the frame 1 to a new curvature. The rods 7 are screw-threaded and pass through the webs 12—13 of the U-beam supports 4 or 4a, as the case may be. Nuts 14—15 on opposite sides of the webs 12—13 serve to fix the rods in any desired position and spacers 16 can circle the rods as they pass between the webs and maintain the strength and spacing of the webs. These rods may be as numerous as is necessary to sustain the bending frames in their set shape under the conditions of pressure applied by the supports 4—4a.

The bending frame as shown in section in FIG. 4 is approximately 1 inch in thickness from the base, which is attached to the flanges of the plates 8, to the top of its curved face 1d, the curvature of which is circular as shown. This curved face is advantageous as limiting the contact of the frame with the glass to a single line. The frame may be otherwise shaped in cross section and length, but this shape has been found advantageous. The frame can be made more flexible by decreasing its size and less flexible by increasing its size. It can be made of metal tubing such as steel tubing, which is flexible, but of great strength.

By virtue of the ability to change curvature which is inherent in this structure, it is possible to reduce greatly the amount of equipment necessary to produce windshields of different curvature. The same principle is applicable to the bending of all glass objects, to which a desired curvature can be imparted by changing the curvature of the bending frames. The frames as shown have length and height corresponding to that of the desired windshield. The frames may be faced with glass fibers or mats which act as buffers between the hot glass and the bending frames. The rigid supports 4—4a are preferably made of metallic sections welded together and approximate the shape of the bending frames.

The apparatus, particularly, when employed to impart double curvature to a glass plate, may be supplied with an auxiliary pressing matrix or buffer 5 which includes a rigid support 20 which does not engage the glass, and a flexible pad 21 which projects from one face of support 20 toward the glass and serves to assist the glass to take the shape imposed by the bending frames without marring the glass surface. The buffer can be conveniently made by superimposing several sheets or layers of glass fibers which are assembled so as to present a curved surface. The buffer is mounted on the support 20 which may be composed of wood or metal, as desired.

This apparatus has been successively employed in a form akin to FIG. 2, the buffer acting conjointly with the frames to produce the bending of the glass sheet. Due to the fact that it is flexible, and because no counter pressure exists on the face of the glass opposite to that of the buffer, the buffer does not leave any impression on the glass. The bending frame 1a is adjusted, with relation to a plane tangent to the face of the buffer, to increase or decrease the area of contact of the buffer with the glass, and also the amount of pressure applied by the buffer to the glass.

By means of this invention, the inventor has obtained windshields having double curvature and an arch of 13 mm. in a length of 29 cm. whereas the full shaping presses, having complete faces engaging the whole of the opposite sides of the glass could only produce a satisfactory arch of 3–4 mm. in the same length, 29 cm. The curvature imparted by the new process and apparatus is equally perfect or superior to that produced by the full engagement jaws. Another advantage of the invention is that the great cost of apparatus for producing curved sheets of double curvature is greatly reduced. The number of apparatus needed to produce different curvatures in similar articles is reduced. The capital required is reduced. The labor and difficulty of producing bending presses having complete jaws is eliminated.

The invention includes the following features alone or combined: the process of making a curved glass object by bringing a glass plate to bending temperature and applying bending stresses to an annular region only, with or without the assistance of a flexible buffer applied to one side only of the glass; an apparatus for glass bending employing an annular frame for the bending, such apparatus in its preferred form being adjustable to different curvatures and involving the capaicty to produce bends of cylindrical or double curvature at will; when rigid bending frames are employed, a plurality of conforming pairs is maintained each pair having a selected curvature; when frames of adjustable curvature are employed, a single frame may be employed for a wide variety of curves; when a buffer is used to engage one face of the glass to assist it to take the form imposed by the bending frames, the buffer is preferably formed of glass fibers or of other felted or matted fibers which are capable of resisting the temperature of hot glass.

As many apparently widely different embodiments of the present invention may be made without departing from the spirit and scope thereof, it is to be understood that the invention is not limited to the specific embodiments.

What is claimed is:

1. A method of bending a vertically suspended hot sheet of glass which has been heated to bending temperature, to effect a double curvature in the sheet, which comprises applying the pressures of bending over substantially annular marginal areas only of the glass, and substantially simultaneously applying to one face only of the inner area of the sheet a resilient former having the desired curvature.

2. Glass bending apparatus consisting essentially in its glass engaging parts of vertically arranged annular frames having complementary shapes of the curvature desired, such curvature approximating the outline of the bent object, a rigid support for each of said frames, each support being positioned generally in alignment with its frame and axially outwardly thereof, each frame being connected to its support by rod-like means, and a former secured to one of the supports and extending axially inwardly through its respective frame into cooperation with a sheet of glass gripped between the opposing frames.

3. The apparatus of claim 2 wherein one of the frames has a convex shape and the former has a convex operating surface and is mounted on the support which carries the frame which is bent to convex shape.

4. Glass bending apparatus consisting essentially in its glass engaging parts of vertically arranged annular frames which are bendable into complementary shapes having the curvature desired, such curvature approximating the outline of the bent object, a rigid support for each of said frames, each support being positioned generally in alignment with its frame and generally axially outwardly thereof, each frame being connected to its support by rod means pivotally connected to the frame and adjustbaly connected to the support, whereby each frame may be bent to alter its curvature, and a former secured to one of the supports and extending axially inwardly through its respective frame into cooperation with a sheet of glass gripped between the opposing frames.

5. The apparatus of claim 4 wherein one of the frames is bent into a convex shape and the former has a convex operating surface and is mounted on the support which carries the frame which is bent to convex shape.

6. Glass bending apparatus consisting essentially, in its glass engaging parts, of annular frames having the curvature desired and conforming shapes approximating the outline of the bent object, and resilient pad means to engage one side of the glass within the frames during the shaping of the glass by the frames, and means to bring the frames together on a suspended glass object.

References Cited in the file of this patent

UNITED STATES PATENTS

| | | |
|---|---|---|
| 1,889,881 | Thompson | Dec. 6, 1932 |
| 2,167,318 | Verlay | July 25, 1939 |
| 2,242,189 | Zelov et al. | May 13, 1941 |
| 2,251,159 | Owen | July 29, 1941 |
| 2,409,142 | McCoy | Oct. 8, 1946 |
| 2,518,918 | Mauge | Aug. 15, 1950 |
| 2,560,599 | Ryan | July 17, 1951 |
| 2,677,918 | Bird et al. | May 11, 1954 |
| 2,691,854 | Rugg | Oct. 19, 1954 |

FOREIGN PATENTS

| | | |
|---|---|---|
| 261,928 | Switzerland | Sept. 1, 1949 |